Jan. 17, 1939.　　G. W. JOHNSON　　2,144,064
BALANCING DEVICE FOR EXTRACTORS
Filed Jan. 27, 1936

INVENTOR
GEORGE W. JOHNSON
BY
Brockett, Hyde, Higley & Meyer
ATTORNEYS

Patented Jan. 17, 1939

2,144,064

UNITED STATES PATENT OFFICE 2,144,064

BALANCING DEVICE FOR EXTRACTORS

George W. Johnson, Cincinnati, Ohio, assignor to The American Laundry Machinery Company, Norwood, Ohio, a corporation of Ohio Application January 27, 1936, Serial No. 60,962

12 Claims. (Cl. 210—71)

This invention relates to an apparatus for damping the vibrations of rotating bodies. The invention is particularly adapted for application to high speed apparatus such as centrifugal extractors, wherein operation is intermittent and it is practically impossible to perfectly balance the load of work.

The principal object of the invention being thus to reduce vibration of a rotating body, the invention embraces novel means for the purpose as will appear. Briefly the invention contemplates the provision of centripetal mass means interconnected with the body for independent rotation about an axis having fixed relation with that of the body rotation.

Preferably and more particularly the mass means may comprise a pair of members, one immediately associated with the body as described, and a second member mounted upon the first member to permit controlled transverse relative motion between the mass members. Such mass means is set forth in Patent No. 1,493,897, issued May 13, 1924, to Robertson.

It is a further object of the invention that the mass means have maximum effect upon the rotating body and to this end the invention embraces means for actuating the mass means at a speed other than that of the body so that when the body is operating at critical speeds the centripetal effect of the mass means may be enhanced by its operation at a higher speed than that of the body. Or, by the higher speed of the mass means it may have less weight than would otherwise be necessary for a given centripetal effect.

Figure 1:
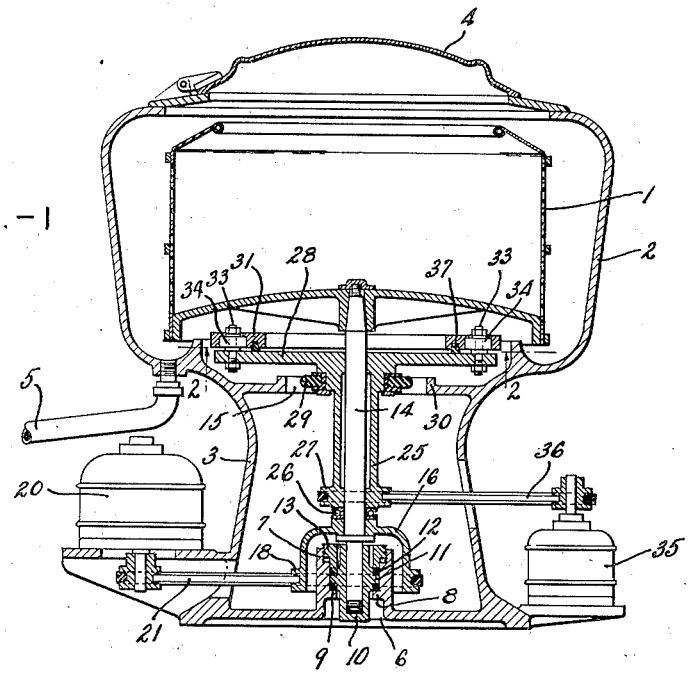
Figure 2:
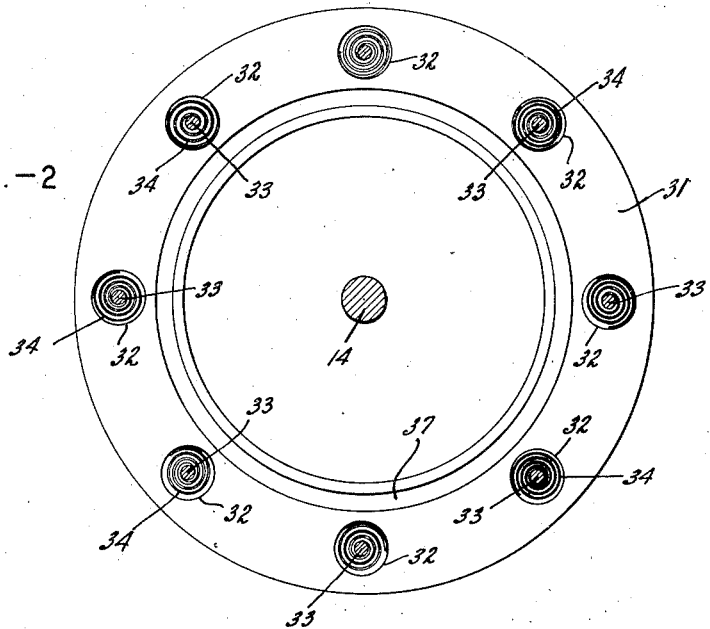

My invention will be better understood by reference to the accompanying drawing in which Fig. 1 is a typical sectional elevation of a centrifugal extractor, showing an embodiment of my invention applied thereto; and Fig. 2 is a transverse sectional view on the line 2—2 of Fig. 1, showing details of the centripetal device employed.

As illustrated in the drawing, a perforated extractor basket 1 is arranged within a casing 2 which has a supporting base part 3. The casing 2 is provided with a cover 4 and a drain 5. The base 3 is provided with an opening 6 surrounded by an upwardly extending collar 7. Extending inwardly from collar 7 is an annular flange 8 which supports a resilient ring 9. A bushing 10 closed at its lower portion is arranged in the opening 6 and has an outwardly extending flange 11 which is supported upon the resilient ring 9. A resilient ring 12 is also superposed upon the flange 11 and is held in place by an apertured nut 13 which is threaded to the upper portion of collar 7. Bushing 10 forms a bearing for a shaft 14 which extends upwardly thereof and carries the perforated container 1. In view of the resiliency of rings 9 and 12 which are preferably formed of rubber, it will be apparent that while the shaft 14 is maintained generally upright, yet it may be tilted somewhat in a universal manner.

Surrounding the collar 7 is a housing 16, the upper portion of which is rigidly secured with shaft 14. The lower portion of housing 16 is grooved to form a pulley 18 in the plane of the flange 11, so that the extractor basket 1 may be driven as by motor 20 and belt 21.

Rotatably mounted upon the shaft 14 is a sleeve 25, supported by a ball bearing 26 upon the housing 16. The lower portion of sleeve 25 is grooved to form a pulley 27 arranged to be driven by motor 35 through belt 36, and the upper portion of the sleeve 25 terminates in an outwardly extending plate 28. A resilient bumper 29 is mounted upon the upper portion of the sleeve to engage an annular flange 30 surrounding the opening 15, thereby limiting the tilting of container 1.

A flat ring 31 provided with a plurality of circumferentially spaced openings 32 is mounted upon the plate 28. Studs 33 extend through the openings 32, each stud being rigidly secured to the plate and surrounded by a spiral spring 34 within its opening 32. The inner end of each spring is attached to its stud 32 and the outer end seats within the corresponding opening. Preferably adjacent springs are wound in opposite directions.

Obviously by the arrangement just described, relative motion transverse of the axis is permitted between the ring 31 and the plate 28, such motion being yieldably opposed by the springs 34, the springs transferring driving torque from the plate to the ring yet permitting the ring to act as a centripetal mass and find its own center during high speed operation. Energy-absorbing means are provided to oppose such relative motion and here comprises simply a ring 37 of rubber or the like resting upon the plate 28 and seating in an annular groove in the ring 31 to support the ring on the plate and relieve the springs 34 of loads other than in transverse directions.

Operation of the extractor as such will be generally as follows: A load of wet fabric is placed in the basket 1 by opening the cover 4, and the load roughly disposed generally peripherally of the basket. After closing of the cover 4 the basket is rotated by the motor 20. During operation of the basket centrifugal force removes the liquid from the work, the liquid flowing radially outwardly through the basket perforations, thence downwardly by gravity and away by the drain pipe 5. The basket, being eccentrically loaded in the practical but unbalanced disposition of the work therein, tends to find its own center because of the described non-rigid mounting of its supporting shaft 14. However, the tendency is great for the basket to set up a good deal of vibration in the machine. Also, during acceleration of the basket to extracting speed, the basket usually passes through several critical speeds of extreme vibration.

According to my invention the mass means described is accelerated by the motor 35 in advance of the basket so that by the time the basket has attained a critical speed the mass means is already in high speed operation to oppose basket vibration. Supposing the motor 35 to be of variable speed under operator control, in any given instance the necessary speed of the mass means for any given basket condition may be quickly determined and thereafter the mass means be maintained in operation only at such speeds as are necessary to accomplish its purpose.

After sufficient extraction has taken place, the motor 20 is shut off and the basket decelerates. Usually in decelerating the basket passes through critical speeds as in its acceleration so that the mass means is maintained in operation until the basket has decelerated below its lowest critical speed. After the basket has stopped, the work, now relatively dry, is removed.

While my improved device has been shown in combination with an extractor for which it is particularly suitable, it will be understood that I do not desire to limit my invention in this respect, as obviously it may be applied to reduce vibrations in rotating bodies of various types, such as flywheels and the like.

To those skilled in the art many modifications and different embodiments of my invention will suggest themselves without departing from the spirit and scope thereof. My improved extractor and the description herein are merely illustrative and are not intended in any sense to be limiting.

What I claim is:

1. In combination with a rotating body, centripetal mass means interconnected with said body for independent rotation about the axis of body rotation with limited lateral motion relative thereto, and means for driving said mass means at a speed greater than that of said body.

2. In combination with a body mounted to permit it to find its own center of rotation, centripetal mass means interconnected with said body for independent rotation about the axis of body rotation with limited motion lateral thereof, and means for driving said mass means independently of said body.

3. In combination with a rotating body, mass means comprising a member interconnected with said body for rotation independent thereof about the axis of body rotation, and a second member mounted on said first member for motion relative thereto in a plane transverse of said axis, and means for driving said first member at a speed greater than that of said body.

4. In combination with a rotating body, mass means comprising a member interconnected with said body for rotation independent thereof about the axis of body rotation, and a second member mounted on said first member for motion relative thereto in a plane transverse of said axis, means yieldably opposing said relative motion, and means for driving said first member at a speed greater than that of said body.

5. In combination with a rotating body, mass means comprising a member interconnected with said body for rotation independent thereof about the axis of body rotation, and a second member mounted on said first member for motion relative thereto in a plane transverse of said axis, said members being disposed in substantial dynamic balance about said axis, and means for driving said first member at a speed greater than that of said body.

6. In combination with a rotating body, mass means comprising a member interconnected with said body for rotation independent thereof about the axis of body rotation, and a second member mounted on said first member for motion relative thereto in a plane transverse of said axis, said members being disposed in substantial dynamic balance about said axis, means effective between said members for yieldably maintaining said second member in its said balanced disposition, and means for driving said first member at a speed greater than that of said body.

7. In combination with a rotating body, mass means comprising a member interconnected with said body for rotation independent thereof about the axis of body rotation, and a second member mounted on said first member for motion relative thereto in a plane transverse of said axis, said members being disposed in substantial dynamic balance about said axis, friction means effective between said members for opposing said relative motion therebetween, and means for driving said first member at a speed greater than that of said body.

8. In combination with a rotating body, mass means comprising a member interconnected with said body for rotation independent thereof about the axis of body rotation, and a second member mounted on said first member for motion relative thereto in a plane transverse of said axis, said members being disposed in substantial dynamic balance about said axis, means effective between said members for yieldably maintaining said second member in its said balanced disposition and for opposing said relative motion between said members, and means for driving said first member at a speed greater than that of said body.

9. Means for opposing the vibration of a rotating body and comprising centripetal mass means disposed concentrically with said body, means interconnecting said body and mass means and permitting relative rotation therebetween about their common axis and movement lateral thereof, and means for driving said mass means about said axis at a higher speed than that of said body.

10. Means for opposing the vibration of a rotating body and comprising rotatably mounted mass means of less weight than that of said body, and means for driving said mass means at a speed greater than that of said body, said mass means being associated with said body for lateral yield therebetween that its centripetal forces may be effective upon said body.

11. In a machine of the class described and having a work-container and means for driving said container at a high speed and including a shaft, mass means, of less weight than that of said container when loaded, said mass means including a member rotatably mounted on said shaft, a second member and means mounting said second member upon said first member and permitting limited movement of said second member upon the first, transverse of said shaft, and means for driving said first mass means member at a higher speed than that of said container.

12. In combination with a rotating body, mass means comprising a member interconnected with said body for rotation independent thereof about the axis of body rotation, a second member mounted on said first member for motion relative thereto in a plane transverse of said axis, friction means arranged to absorb energy responsive to said relative motion between said members, and means for driving said first member at a speed greater than that of said body.

GEORGE W. JOHNSON.